United States Patent
Nakayama et al.

(10) Patent No.: US 6,881,126 B2
(45) Date of Patent: Apr. 19, 2005

(54) TRACTION DRIVE ROLLING ELEMENT AND METHOD OF FORMING THE SAME

(75) Inventors: Tatsuomi Nakayama, Kanagawa (JP); Minoru Ota, Kanagawa (JP); Minoru Numakura, Kanagawa (JP); Mamoru Saito, Kanagawa (JP); Hidenori Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/686,590

(22) Filed: Oct. 17, 2003

(65) Prior Publication Data
US 2004/0082272 A1 Apr. 29, 2004

(30) Foreign Application Priority Data
Oct. 17, 2002 (JP) ...................... 2002-302842

(51) Int. Cl.[7] ............................... B24B 49/00
(52) U.S. Cl. ........................... 451/11; 451/52
(58) Field of Search .................. 451/11, 57, 65, 451/52, 51, 62; 476/72, 73, 40

(56) References Cited

U.S. PATENT DOCUMENTS 6,527,667 B1 * 3/2003 Oshidari et al. .......... 476/40
6,629,906 B1 * 10/2003 Chiba et al. .................. 476/72
6,652,413 B1 * 11/2003 Nanbu et al. ................ 476/73

FOREIGN PATENT DOCUMENTS

JP 2002-89644 A 3/2002

* cited by examiner

Primary Examiner—Dung Van Nguyen
(74) Attorney, Agent, or Firm—Foley & Lardner LLP

(57) ABSTRACT

A method of forming a traction drive rolling element including: forming a preform having a working surface with an arcuate profile in section taken along a central axis; supporting the preform to be rotatable about the central axis; allowing a relative movement between the preform and a grooving tool for moving the grooving tool along the arcuate profile, simultaneously with rotating the preform about the central axis, to form microscopic recesses and projections alternately arranged in a direction perpendicular to the central axis along the arcuate profile; pressing a grindstone having a contact surface area of 25 mm$^2$ or less, on the working surface; and allowing a relative movement between the preform and the grindstone for moving the grindstone along the arcuate profile simultaneously with rotating the preform while keeping pressing the grindstone on the working surface until a height of the microscopic projections becomes 3 μm or less.

23 Claims, 8 Drawing Sheets

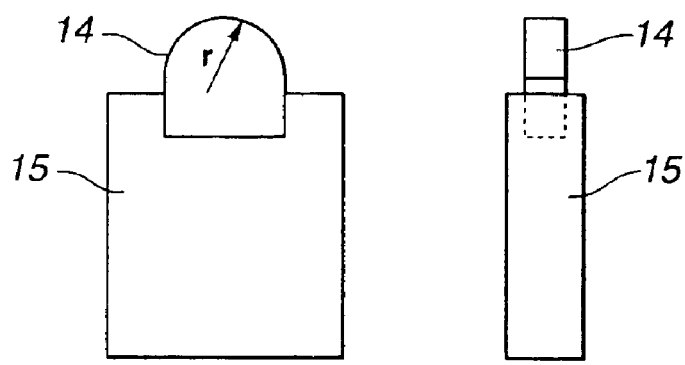
FIG.9A  FIG.9B
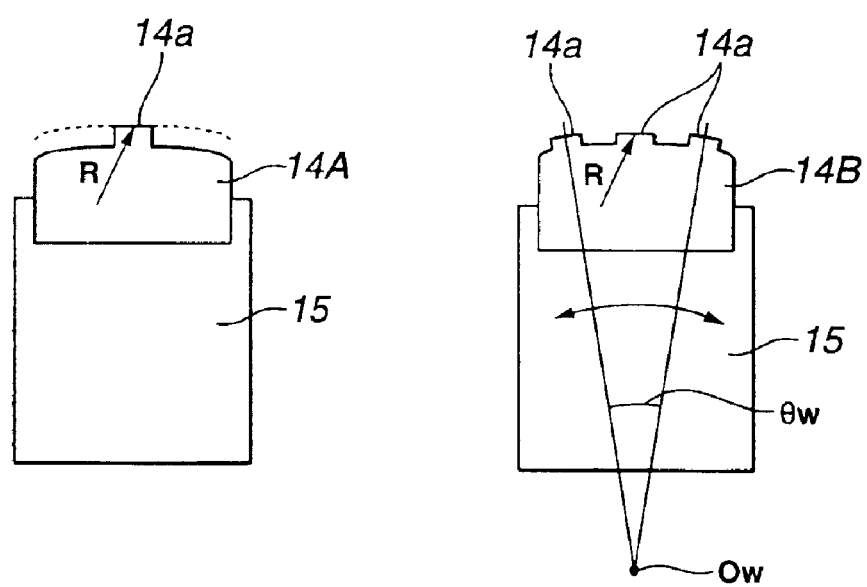
FIG.10A  FIG.10B

TRACTION DRIVE ROLLING ELEMENT AND METHOD OF FORMING THE SAME

BACKGROUND OF THE INVENTION

The present invention relates to a traction drive rolling element, for instance, input and output disks and power rollers, used in a traction drive transmission for a vehicle. More specifically, the present invention relates to a method of forming a traction drive rolling element, i.e., input and output disks, which has an improved traction surface for transmitting power via a traction oil film.

U.S. Pat. No. 6,527,667 (corresponding to Japanese Patent Application First Publication No. 2002-89644) discloses a traction drive rolling element having a traction surface formed with microscopic recesses and projections to thereby realize improved traction characteristic. The microscopic recesses and projections are formed into a generally trapezoidal shape, a generally triangular shape and the like by lapping.

SUMMARY OF THE INVENTION

However, the traction drive rolling element having the microscopic recesses and projections on the traction surface undergoes large edge stress caused at a corner of each of the microscopic projections, namely, at a peripheral edge of each of the microscopic recesses. This causes large stress on traction surfaces of disks or power rollers as counterparts, which will influence durability of the traction surface. Further, generally, upon forming the microscopic projections into a crown shape by a so-called crowning, the microscopic projections are subjected to grinding using a lapping tape with abrasive grains or a grindstone. In the forming process, it is difficult to form a curved or rounded surface at the corner of the microscopic projection. Otherwise, it will be expected that the microscopic projections are subjected to grinding using a superfinishing grindstone. However, upon using superfinishing grindstone, it is also difficult to round microscopic projections at the corners though projections having height and pitch as relatively large as several millimeters can be rounded at the corners. As a result, relatively long time is required to form the microscopic crowned-projection as well as the rolling element with the microscopic crowned-projection.

It is an object of the present invention to provide a traction drive rolling element having improved traction characteristic and durability and a method of forming the traction drive rolling element, the method being capable of increasing the efficiency of production of the traction drive rolling element.

In one aspect of the present invention, there is provided a method of forming a traction drive rolling element including a traction surface which has microscopic crowned-projections, the method comprising:

forming a workpiece into a preform having a central axis and a working surface having an arcuate profile in cross section taken along the central axis;

supporting the preform so as to be rotatable about the central axis;

allowing a relative movement between the preform and a grooving tool such that the grooving tool is moved along the arcuate profile of the working surface, simultaneously with rotating the preform about the central axis, to thereby form a plurality of microscopic recesses and microscopic projections alternately arranged in a direction perpendicular to the central axis along the arcuate profile;

pressing a grindstone on the working surface of the preform, the grindstone having a contact surface area of not more than 25 $mm^2$ in which the grindstone is contacted with the working surface; and allowing a relative movement between the preform and the grindstone such that the grindstone is moved along the arcuate profile of the working surface simultaneously with rotating the preform about the central axis while keeping pressing the grindstone on the working surface until a height of the microscopic projections becomes not more than 3 $\mu$m, to thereby form the traction drive rolling element including the traction surface having the microscopic crowned-projection.

In another aspect of the invention, there is provided a traction drive rolling element, comprising:

a traction surface having an arcuate profile in cross section taken along a rotation axis; and microscopic crowned-projections disposed along the arcuate profile, the microscopic crowned-projections having a height of not more than 3 $\mu$m and a rounded corner portion which has a radius of curvature ranging from 2 mm to 10 mm.

BRIEF DESCRIPTION OF THE DRAWINGS

FIG. 9A is an enlarged plan view of a grindstone of the apparatus shown in FIG. 8A.

FIG. 9B is a side view of the grindstone shown in FIG. 9A.

FIGS. 10A and 10B are plan views of modifications of the grindstone, respectively.

DETAILED DESCRIPTION OF THE INVENTION

Figure 1:
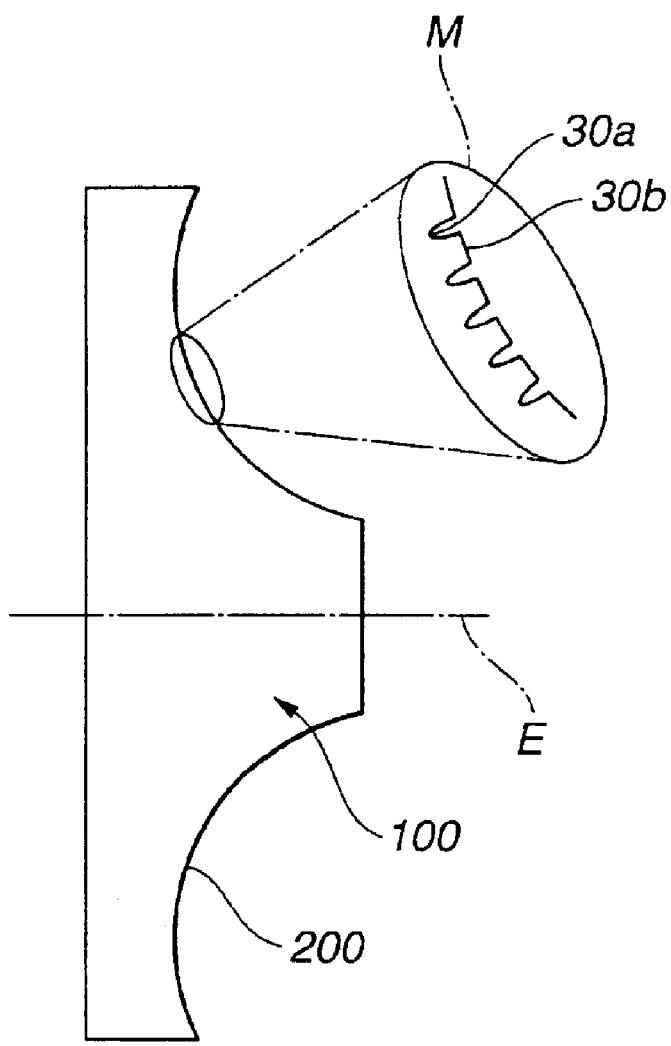
FIG. 1 is a cross section of a disk as a traction drive rolling element formed by the method of the present invention, taken along a rotation axis of the disk, partially showing an enlarged traction surface of the disk.

Referring to FIG. 1, there is shown disk 100 acting as a traction drive rolling element of the present invention. Disk 100 cooperates with a power roller, not shown, to constitute a traction drive transmission. Disk 100 has rotation axis E about which disk 100 is rotatable, and traction surface 200 which has an arcuate profile in section taken along rotation axis E. The arcuate profile lies in a plane containing rotation axis E. Circled part M of FIG. 1 shows an enlarged schematic view of a part of the arcuate profile of traction surface 200. As shown in circled part M, traction surface 200 includes microscopic recesses 30a and microscopic crowned-projections 30b which are alternately arranged in a direction extending along the arcuate profile. Each of microscopic crowned-projections 30b is defined by adjacent two of microscopic recesses 30a and disposed therebetween. Microscopic recesses 30a and microscopic crowned-projections 30b are disposed over the entire circumference of traction surface 200 of disk 100.

Figure 2:
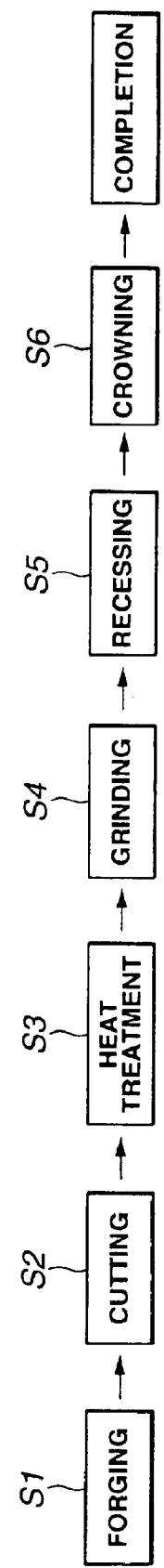
FIG. 2 is a block diagram showing the process for production of the disk which includes the method of the present invention.

Referring to FIG. 2, a process for producing disk 100 is explained. At step S1, a workpiece is subjected to forging to form a rough shape of disk 100. At step S2, the rough-shaped workpiece is subjected to cutting to form a disk shape. At step S3, the disk-shaped workpiece is subjected to heat treatment. At step S4, the workpiece is subjected to grinding to form a preform having a surface which serves for traction surface 200. At step S5, the preform is subjected to recessing to form microscopic recesses and microscopic projections alternately arranged on the surface. At step S6, the preform is subjected to crowning to form the microscopic projections into microscopic crowned-projections 30b. Thus, disk 1 having traction surface 200 formed with microscopic recesses 30a and microscopic crowned-projections 30b is produced.

Meanwhile, in a case where a surface roughness of traction surface 200 is required to decrease, the preform may be subjected to superfinishing after forming microscopic crowned-projections 30b. Further, the recessing step at step S5 can be carried out before the grinding step at step S4. Further, in order to adjust a height of microscopic crowned-projections 30b, the preform can be subjected to grinding or cutting after forming microscopic crowned-projections 30b. Specifically, the height of microscopic crowned-projections 30b means a distance between a bottom of microscopic recesses 30a and a top of microscopic crowned-projections 30b.

Figure 3:
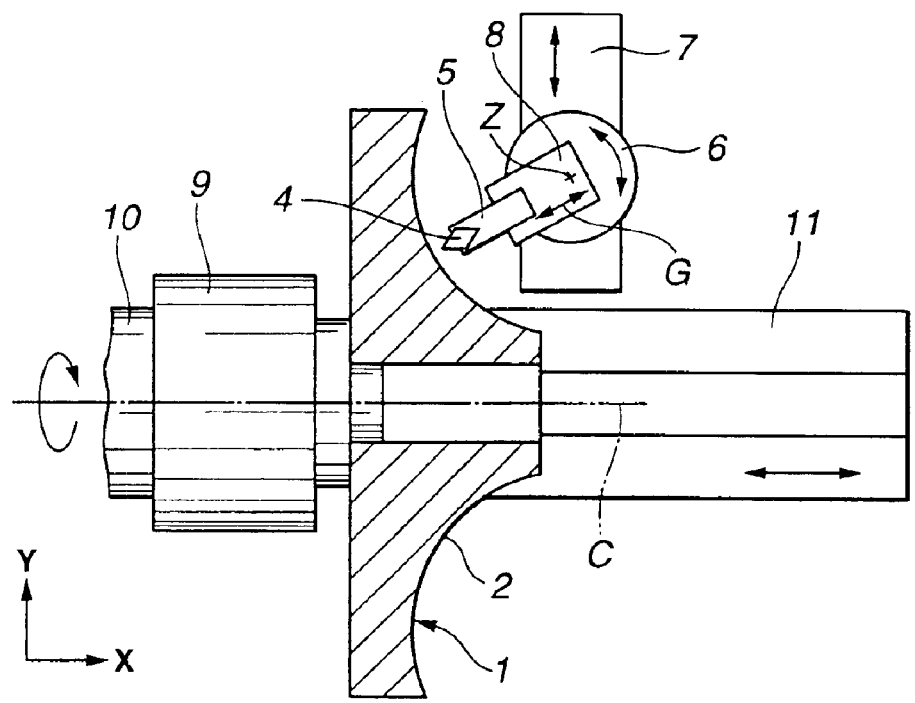
FIG. 3 is an explanatory diagram showing an apparatus for forming microscopic recesses and projections on a surface of a workpiece for the disk.

Referring to FIG. 3, one example of an apparatus useable at the recessing step of the present invention is explained. In FIG. 3, reference characters X, Y and Z denote a left-and-right direction, an upward-and-downward direction, and a direction perpendicular to the left-and-right direction and the upward-and-downward direction, respectively, as viewed in a plane of FIG. 3. The apparatus includes main shaft 10 rotatable about rotation axis C, chucking machine 9 supporting preform 1 on main shaft 10 in concentric relation thereto, and main shaft table 11 moving main shaft 10 in a direction of rotation axis C parallel to direction X. Preform 1 is thus supported on main shaft 10 so as to be rotatable about rotation axis C aligned with a central axis of preform 1. Although chucking machine 9 supports a central portion of preform 1, chucking machine 9 may be constructed to support an outer circumferential periphery of preform 1.

The apparatus further includes linear table 7 disposed near main shaft table 11. Liner table 7 supports rotating table 6 so as to move in direction Y and rotate about a rotation axis extending in direction Z. Rotating table 6 supports tool moving table 8 so as to guide tool holder 5 with grooving tool 4 in direction G perpendicular to direction Z. Thus, the apparatus is so constructed as to pivotally move grooving tool 4 along the arcuate profile of working surface 2 of preform 1 by rotating table 6 and simultaneously advance and retard grooving tool 4 relative to working surface 2 by tool moving table 8.

Figure 4:
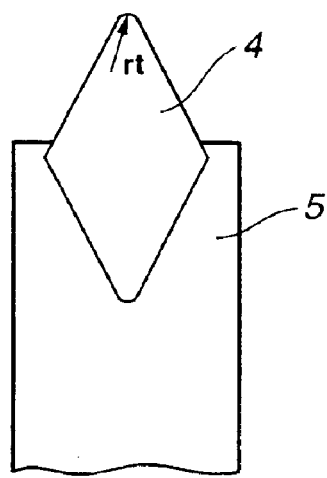
FIG. 4 is an enlarged plan view of a grooving tool used in the apparatus shown in FIG. 3.

FIG. 4 illustrates grooving tool 4 with a tip end having radius of curvature rt. Radius of curvature rt is in a range from 50 $\mu$m to 100 $\mu$m. In this embodiment, grooving tool 4 is a cubic boron nitride (CBN) cutting tool detachable to tool holder 5. A diamond or alumina cutting tool or a grinding tool made of CBN, diamond or alumina may be used as grooving tool 4.

A process of forming the microscopic recesses and projections on working surface 2 of preform 1 by using the apparatus shown in FIG. 3 will be explained hereinafter. First, grooving tool 4 is moved in direction Y so as to be opposed to the arcuate profile of working surface 2 which is taken along rotation axis C of main shaft 10, namely, the central axis of preform 1. Subsequently, main shaft table 11, linear table 7 and tool moving table 8 are driven, and if necessary, a length of tool holder 5 is adjusted, so as to conduct positioning of grooving tool 4 relative to the arcuate profile of working surface 2.

Figure 5:
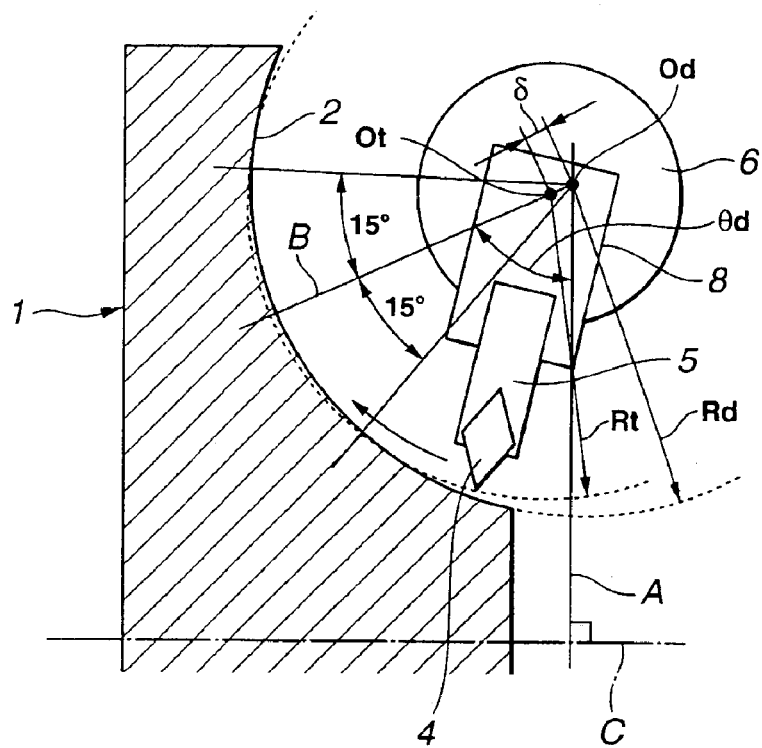
FIG. 5 is an explanatory diagram showing positioning of the grooving tool upon forming the microscopic recesses and projections on the surface of the workpiece.

Referring to FIG. 5, a manner of the positioning of grooving tool 4 is explained in detail. In FIG. 5, reference characters Od and Rd denote a center of curvature of the arcuate profile of working surface 2 of preform 1 and a radius of curvature of the arcuate profile thereof, respectively. Line A passes through center Od of curvature of the arcuate profile of working surface 2 and extends perpendicular to rotation axis C. Line B is drawn from center Od of curvature of the arcuate profile of working surface 2 so as to pass through a predetermined transmission ratio point on traction surface 200 formed from working surface 2 at which a transmission ratio of the traction drive transmission is 1.2:1. The transmission ratio means a rotational speed ratio between input and output disks. Reference character $\theta$d denotes an angle made between line A and line B. Reference character $\delta$ denotes the height of microscopic projections 3b to be formed, namely, the distance between the bottom of microscopic recesses 3a to be formed and the top of microscopic projections 3b to be formed. In this state, rotation axis Ot of rotating table 6 is offset or displaced along line B from center Od of curvature of the arcuate profile of working surface 2 so as to approach the arcuate profile thereof by a length corresponding to height $\delta$ of microscopic projections 30b. Further, radius Rt of curvature of locus of the pivotal movement of grooving tool 4, namely, a distance from rotation axis Ot of rotating table 6 to the tip end of grooving tool 4, is set as indicated by the following expression.

$$Rt=[(Rd \sin 15°)^2 +(Rd \cos 15°-\delta^2)^{1/2}]$$

wherein Rd is radius of curvature of the arcuate profile of working surface 2 of preform 1, and $\delta$ is height of microscopic projections 3b to be formed on working surface 2. Here, in the method of the present invention, height $\delta$ of microscopic 3b is set at 3 $\mu$m or less.

Thus, radius Rt of curvature of locus of the pivotal movement of grooving tool 4 is set smaller than radius Rd of curvature of the arcuate profile of working surface 2 by displacing rotation axis Ot of rotating table 6, namely, the pivot axis of grooving tool 4, toward working surface 2 and by setting radius Rt of curvature of locus of the pivotal movement of grooving tool 4 as described above. As a result, if grooving tool 4 is placed on a small-diameter side of preform 1 or a large-diameter side thereof as shown in FIG. 5 before forming microscopic recesses 3a and microscopic projections 3b on working surface 2, grooving tool 4 can be free from contact with working surface 2.

After conducting the positioning of grooving tool 4, preform 1 is rotated by main shaft 10, and at the same time, grooving tool 4 is moved along the arcuate profile of working surface 2 as indicated by arrow in FIG. 5. As a result, microscopic recesses 3a and microscopic projections 3b, which make the distance of not more than 3 μm between the bottom of recesses 3a and the top of projections 3b, are alternately arranged in the direction extending along the arcuate profile of working surface 2.

Upon pivotally moving grooving tool 4, rotating table 6 is operated such that the tip end of grooving tool 4 moves by an arcuate distance of 100 μm to 300 μm along the arcuate profile of working surface 2 per one rotation of preform 1. Microscopic recesses 3a and microscopic projections 3b may be arranged in a spiral form continuously extending by continuously moving grooving tool 4 along the arcuate profile of working surface 2. Otherwise, microscopic recesses 3a and microscopic projections 3b may be arranged in a concentric-circular form by intermittently moving grooving tool 4 along the arcuate profile of working surface 2 at certain intervals. Preform 1 may be rotated at a constant speed. Otherwise, the relative rotating speed of working surface 2 and grooving tool 4 at a contact point therebetween may be set at a predetermined speed, for instance, approximately 250 m/min. In this case, the operation of grooving tool 4 can be maintained constant, whereby the abrasion state of grooving tool 4 can be stabilized. Namely, in a case where microscopic recesses 3a and microscopic projections 3b are formed from the small-diameter side of preform 1 toward the large-diameter side thereof as shown in FIG. 5, the relative rotating speed of working surface 2 and grooving tool 4 can be kept substantially constant by continuously or stepwise reducing the rotating speed of preform 1.

Thus, microscopic recesses 3a and microscopic projections 3b are accurately formed in a predetermined region of working surface 2 of preform 1. The predetermined region includes a region extending in opposite directions at an angle of ±15 degrees as taken around center Od of curvature of the arcuate profile of working surface 2 relative to a line extending from center Od of curvature of the arcuate profile to the predetermined transmission ratio point at which a transmission ratio of the traction drive transmission is 1.2:1. Specifically, as illustrated in FIG. 5, line B extending between the predetermined transmission ratio point and center Od of curvature of the arcuate profile of working surface 2, and line A passing through center Od of curvature of the arcuate profile and extending perpendicular to rotation axis C form angle θd therebetween. Line B and a line extending through each of the second points to center Od of curvature of the arcuate profile make the angle of 15 degrees around the center of curvature of the arcuate profile. The predetermined region thus extends from line B toward the smaller-diameter side of preform 1 and the large-diameter side thereof at the angle of 15 degrees taken around center Od of curvature of the arcuate profile of working surface 2 on both of the smaller-diameter and large-diameter sides.

Figure 6:
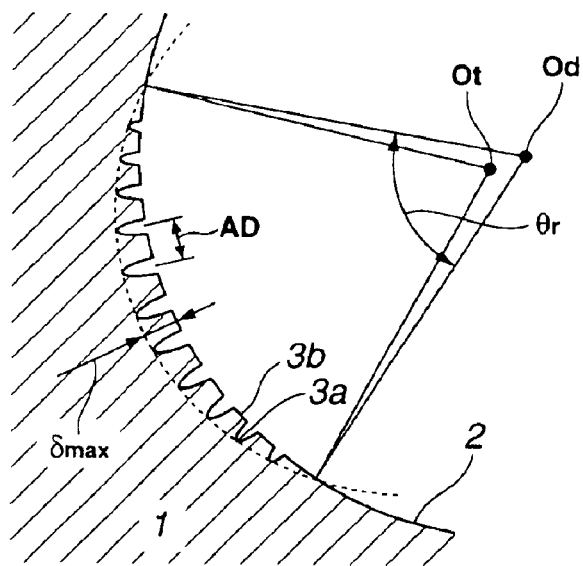
FIG. 6 is an enlarged section of the surface of the workpiece on which the microscopic recesses and projections are formed.

FIG. 6 illustrates an enlarged section of working surface 2 formed with microscopic recesses 3a and microscopic projections 3b. Height θ of microscopic projections 3b, namely, the distance between the bottom of recesses 3a and the top of projections 3b, is not more than 3 μm. Pitch AD, i.e., a distance between adjacent microscopic recesses 3a or adjacent microscopic projections 3b, is in a range from 100 μm to 300 μm. Height θ of microscopic projections 3b becomes maximum as indicated at θmax, at the predetermined transmission ratio point. Height θ of microscopic projections 3b becomes not more than 0.5 μm at opposite ends of the predetermined region of working surface 2 which are positioned on the small-diameter side end and the large-diameter side end, respectively. The predetermined region has a central angle as indicated at θr in FIG. 6. Height θ of microscopic projections 3b continuously varies from the predetermined transmission ratio point to the opposite ends of the predetermined region. Namely, height θ decreases from the predetermined transmission ratio point to the opposite ends of the predetermined region.

Figure 7:
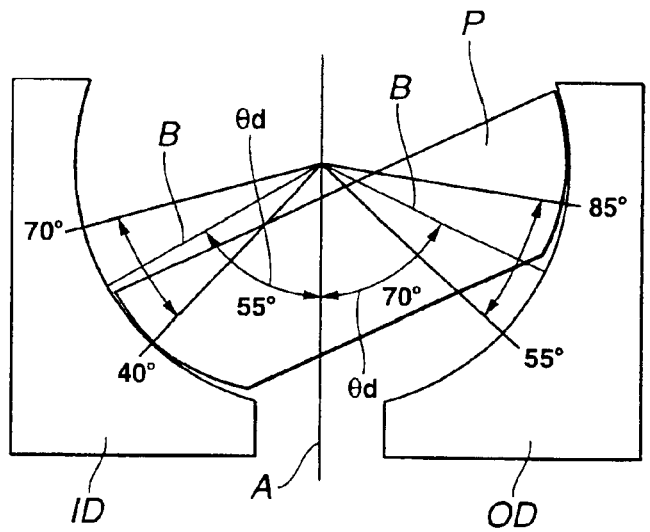
FIG. 7 is an explanatory diagram showing predetermined regions of surfaces of the workpieces as input and output disks where the microscopic recesses and projections are formed.

Upon forming microscopic recesses 3a and microscopic projections 3b on working surface 2 of preform 1, the predetermined region is changed depending on which disk of an input disk or an output disk of the traction drive transmission preform 1 is produced from preform 1. Specifically, as illustrated in FIG. 7, power roller P is pivotally moved between input disk ID and output disk OD. In a case where the transmission ratio is 1.2:1, an input-side contact position where input disk ID is in contact with power roller P differs from an output-side contact position where output disk OD is in contact with power roller P. Therefore, angle θd made by line B passing though the transmission ratio point at the input-side contact position and line A perpendicular to a rotation axis of input disk ID is different from angle θd made by line B passing though the transmission ratio point at the output-side contact position and line A perpendicular to a rotation axis of output disk OD. Angle θd made on the side of input disk ID is 55 degrees, and angle θd made on the side of output disk OD is 70 degrees. Therefore, the predetermined region of working surface 2 of preform 1 for input disk ID has a central angle ranging from 40 degrees to 70 degrees based on angle θd of 55 degrees. On the other hand, the predetermined region of working surface 2 of preform 1 for output disk OD has a central angle ranging from 55 degrees to 85 degrees based on angle θd of 70 degrees. Microscopic recesses 3a and microscopic projections 3b are thus formed in the predetermined region of working surface 2 of preform 1 for each of input disk ID or output disk OD.

Meanwhile, the driving member for pivotally moving grooving tool 4 along the arcuate profile of working surface 2 of preform 1 is not limited to rotating table 6 in this embodiment. The pivotal movement of grooving tool 4 can be performed by cooperatively operating linear table 7 and main shaft table 11 to realize the relative movement between preform 1 and grooving tool 4. In such a case, grooving tool 4 may be positioned so as to orient the tip end to the predetermined transmission ratio point on working surface 2. Owing to the cooperation of the linearly moving members of linear table 7 and main shaft table 11, the apparatus can be simply constructed with reducing the cost.

Height δ of microscopic projections 3b is not limited to the embodiment in which height δ is adjusted to not more than 3 μm at the recessing step using grooving tool 4 as described above. Height δ of microscopic projections 3b can be more than 3 μm at the recessing step using grooving tool 4 as long as height δ is finally adjusted to 3 μm or less by removing the top of microscopic projections 3bsuch that microscopic crowned-projections 30b having the height of 3 μm or less are formed. The operation of removing the top of microscopic projections 3b is explained later.

After the recessing step as described above, the crowing step is conducted in the following manner. Working surface 2 is subjected to grinding using a grindstone having a contact surface area of 25 mm$^2$ or less in which grindstone 14 is in contact with working surface 2. Specifically, first, the grindstone is pressed on working surface 2. Next, preform 1 is rotated about rotation axis C while grindstone 14 is kept pressed on working surface 2. Simultaneously with the rotating and pressing operation, preform 1 and grindstone 14 are relatively moved such that grindstone 14 moves along the arcuate profile of working surface 2 to thereby remove the top of microscopic projections 3b until the height of microscopic projections 3b becomes not more than 3 µm. Microscopic crowned-projections 30b having the height of 3 µm or less and rounded corner portions are thus formed from microscopic projections 3b.

Figure 8A:
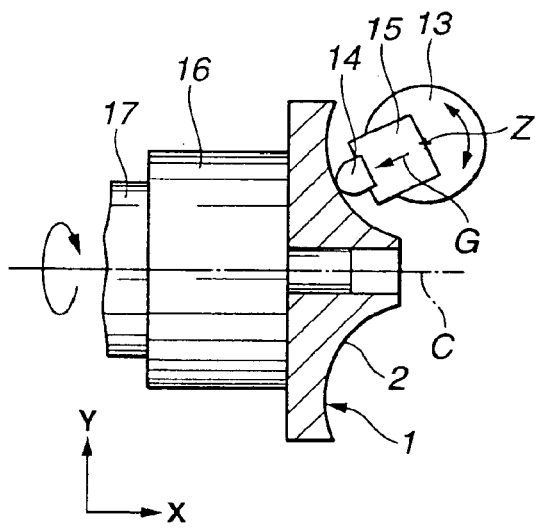
FIG. 8A is an explanatory diagram showing forming microscopic crowned projections on the surface of the workpiece by using an apparatus shown in plan view.
Figure 8B:
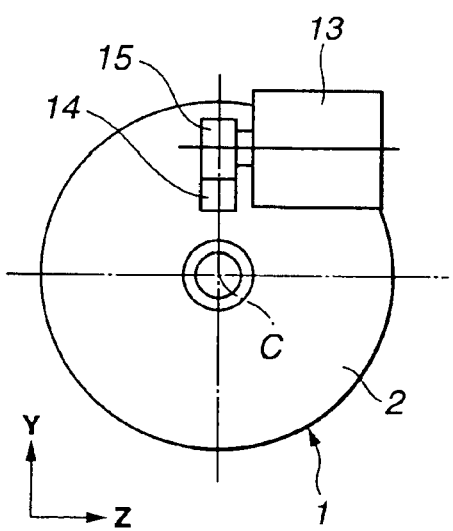
FIG. 8B is an enlarged side view of the apparatus shown in FIG. 8A.

FIGS. 8A and 8B illustrate one example of an apparatus useable at the crowning step of the present invention. In FIG. 8A, reference characters X, Y and Z denote a left-and-right direction, an upward-and-downward direction, and a direction perpendicular to the left-and-right direction and the upward-and-downward direction, respectively, as viewed in a plane of FIG. 8A. In FIG. 8B, same reference characters Y and Z as indicated in FIG. 8A denote same directions. The apparatus includes main shaft 17 rotatable about rotation axis C parallel to direction X and chucking machine 16 supporting preform 1 on main shaft 17 in concentric relation thereto. Main shaft 17 is driven to rotate preform 1 about rotation axis C aligned with the central axis of preform 1. Although chucking machine 16 supports a central portion of preform 1 in the embodiment shown in FIG. 8A, chucking machine 16 may be constructed to support an outer circumferential periphery of preform 1.

The apparatus further includes rotating table 13 rotatable about a rotating axis parallel to direction Z, and disposed near main shaft 17. Rotating table 13 supports grindstone moving table 15 which has grindstone 14 and acts as a grindstone holder. Grindstone 14 is pivotally moveable about a pivot axis, namely, the rotating axis of rotating table 13, at a pivot angle together with rotating table 13. Grindstone moving table 15 is moveable so as to guide grindstone 14 in direction G perpendicular to direction Z.

As illustrated in FIG. 9, grindstone 14 has a rounded tip end. The tip end of grindstone 14 has radius "r" of curvature of 10 mm such that the contact surface area where grindstone 14 is in contact with working surface 2 of preform 1 is 25 mm² or less. In this embodiment, grindstone 14 includes abrasive grains made of white aluminum oxide (WA). Preferably, grindstone 14 has the contact surface area ranging from 4 mm² to 16 mm², and the abrasive grains thereof have a particle size of smaller than No. 1000.

FIGS. 10A and 10B illustrate modifications of grindstone 14, in which grindstones 14A and 14B have protrusions 14a each having radius R of curvature that corresponds to the arcuate profile of working surface 2 of preform 1. FIG. 10A shows grindstone 14A having one protrusion 14a which has the contact surface area of not more than 25 mm², and preferably, in a range of 4 mm² to 16 mm². FIG. 10B shows grindstone 14B having three protrusions 14a which are arranged in circumferentially spaced relation to each other on an outer periphery of grindstone 14B. Specifically, there are middle protrusion 14a and two opposed protrusions 14a, 14a which are disposed on both sides of middle protrusion 14a. Each of two opposed protrusions 14a, 14a has a central line passing through a circumferentially middle point of a top surface thereof and extending across pivot axis Ow of grindstone 14B. The central lines of opposed protrusions 14a, 14a made angle θw therebetween which ranges from an angle smaller by 10 degrees than the pivot angle of grindstone 14B to the pivot angle. A total of the contact surface areas of protrusions 14a is adjusted to not more than 25 mm², and preferably, in a range of 4 mm² to 16 mm². Grindstones 14A and 14B preferably have abrasive grains having a particle size of smaller than No. 1000.

The crowning step of the method of the present invention will be explained hereinafter. At the crowning step, microscopic crowned-projections 30b are formed using the apparatus described above. First, grindstone 14 is placed in a position where grindstone 14 is opposed to the arcuate profile of working surface 2. Subsequent to the positioning of grindstone 14, grindstone 14 is pressed on working surface 2 by a biasing force of a spring, not shown, or a hydraulic or air pressure supplied by a pressure source, not shown. Next, preform 1 is rotated about rotation axis C by driving main shaft 17 while grindstone 14 is kept pressed on working surface 2. Simultaneously with the rotating and pressing operation, grindstone 14 is pivotally moved along the arcuate profile of working surface 2 by driving rotating table 13.

During the pivotally moving operation, grindstone 14 and each of protrusions 14a of grindstones 14A and 14B are pressed on working surface 2 at a force ranging from 50 N to 500 N. Preform 1 is rotated such that an average circumferential velocity at the contact point where working surface 2 and grindstone 14 are in contact with each other is in a range from 25 m/min to 350 m/min. Grindstone 14 is pivotally moved at a speed ranging from 5 cycles/min to 100 cycles/min by reciprocally turning rotating table 13. It is preferred that the pressing force applied to grindstone 14 and each of protrusions 14a of grindstones 14A and 14B is 100 N, the average circumferential velocity at the contact point of working surface 2 and grindstone 14 is 70 m/min, and the speed of the pivotal movement of grindstone 14 is 15 cycles/min. More preferably, when grindstone 14 is pivotally moved relative to working surface 2, the rotational speed of working surface 2 is continuously changed such that the circumferential velocity of working surface 2 at the contact point of working surface 2 and grindstone 14 is constant.

In a case where grindstone 14 is pivotally moved relative to working surface 2 after forming microscopic projections 3b having a relatively large height, microscopic projections 3b may be abraded and removed by a depth of not more than 5 µm from an outer-most surface thereof such that microscopic crowned-projections 30b having the height of 3 µm or less are formed.

In this embodiment, grindstone 14 is pivotally moved in the predetermined region of working surface 2 of preform 1 so that each of microscopic projections 3b can be formed with a rounded surface at the corner portion thereof. If grindstone 14 is pivotally moved along the entire region of the arcuate profile of working surface 2, a surface roughness of traction surface 200 of disk 100 can be kept constant in the entire region thereof. Further, the apparatus shown in FIG. 8 may further include main shaft table 11 and linear table 7 as shown in FIG. 3. With such an apparatus, the relative movement between preform 1 and grindstone 14 can be achieved such that grindstone 14 is pivotally moved along the arcuate profile of working surface 2 by cooperating main shaft table 11 and linear table 7.

Figure 12:
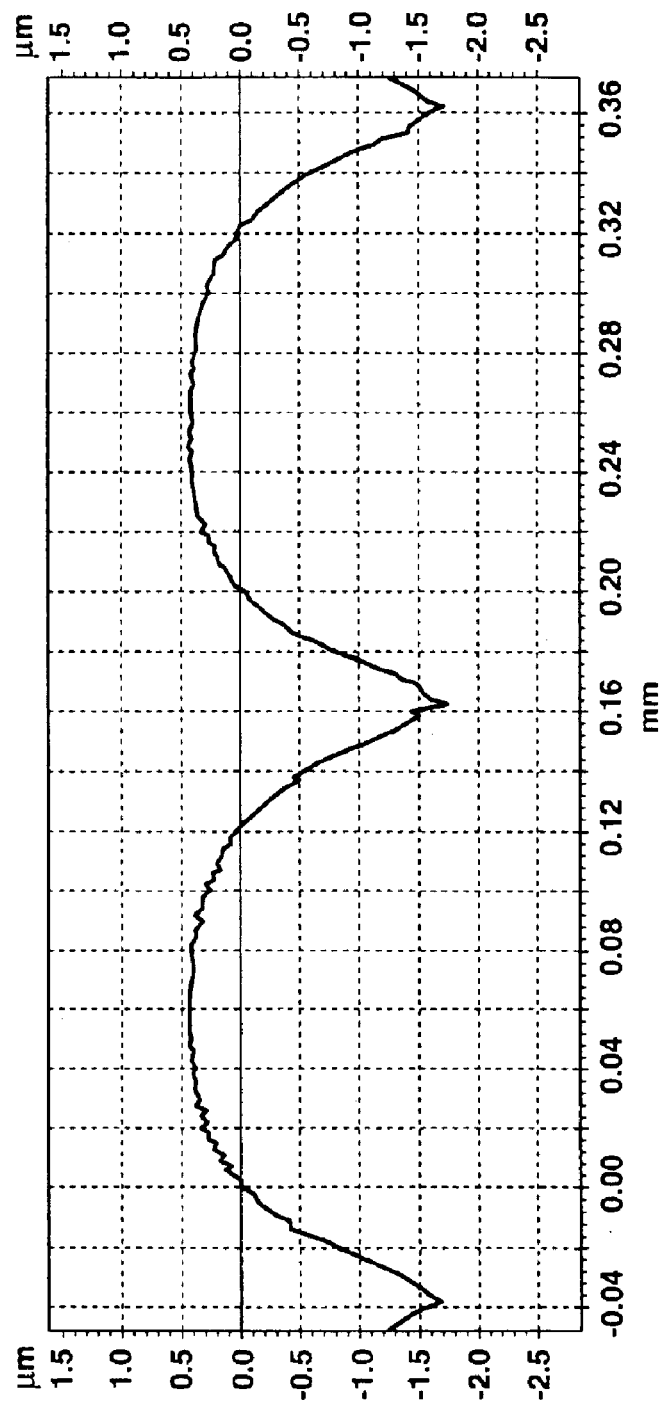
FIG. 12 is a graph showing a profile curve of the traction surface obtained by the method of the present invention.

As a result, microscopic crowned-projections 30b having the height of 3 µm or less can be formed. FIG. 12 illustrates a cross-section of traction surface 200 of disk 100 produced by the method of the present invention. As illustrated in FIG. 12, the corner portions of each of microscopic crowned-projections 30b are crowned or rounded, and microscopic crowned-projection 30b exhibits a smoothly rounded profile curve as a whole. Specifically, a radius of curvature of the rounded corner portions of microscopic crowned-projection 30b is in a range from 2 mm to 10 mm. Surface roughness of microscopic crowned-projection 30b is 0.2 µm or less at maximum. Microscopic crowned-projection 30b thus has no sharp edges at the corner portions to thereby be free from large edge stress caused at the corner portions upon contact with counterparts. Therefore, stress caused on traction surfaces of the counterparts will be significantly reduced. This serves for improving traction characteristic of the traction surface and enhancing durability thereof.

Figure 11:
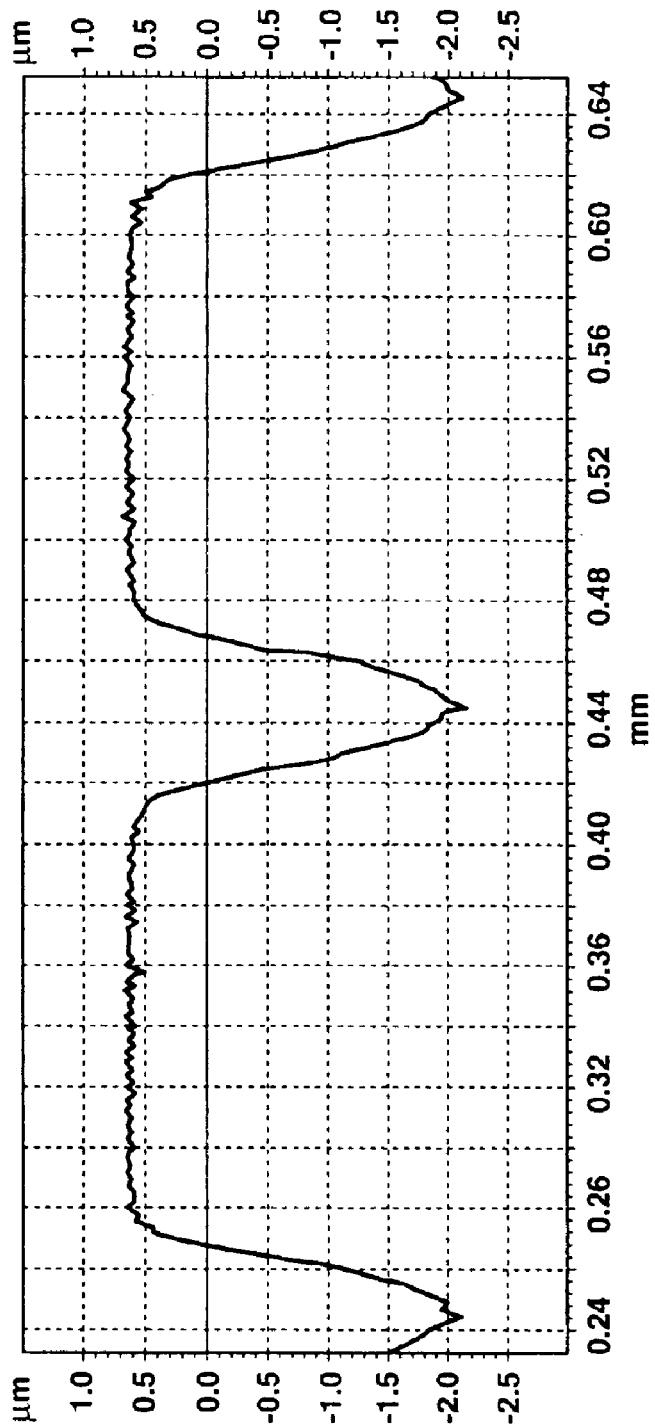
FIG. 11 is a graph showing a profile curve of a traction surface of a rolling element of a related art.

In contrast, FIG. 11 illustrates a cross-section of a traction surface produced by a related art in which only outer-most surfaces of microscopic projections are removed using a conventional grindstone. As shown in FIG. 11, the microscopic projections exhibit top-flattened profile curves without roundness at the corner portions.

The method of forming the traction drive rolling element having the microscopic crowned-projections on the traction surface, according to the present invention, can produce the following effects. Microscopic crowned-projections 30b having the rounded surfaces, which have a radius of curvature in a range from 2 mm to 10 mm, at the corner portions can be formed. Although the formation of such microscopic crowned-projections is difficult in the related art using lapping, microscopic crowned-projections 30b can be more suitably formed by the crowning step of the present invention. This suppresses edge stress which is caused at the corner portions during the operation of the traction drive rolling element, whereby surface defects, for instance, peeling, caused on the traction surface can be restrained. This serves for providing the traction drive rolling element, namely, disk 100, which has enhanced traction characteristic, excellent durability and a compact shape. Further, since the crowning step can be achieved without large working or machining force, the forming apparatus can be compact in size and the formation time can be shortened. This serves for increasing productivity of the traction drive rolling element and reducing the production cost.

Further, as explained above, microscopic crowned-projections 30b are formed in the predetermined region extending at the angle of ±15 degrees in opposite directions from the predetermined transmission ratio point at which the transmission ratio of the traction drive transmission is 1.2:1. This can effectively increase the traction in the region where a traction transmission force is reduced. With the provision of the predetermined region, the formation time and the production cost can be reduced, serving for enhancing lives of the tools used at the recessing and crowning steps and reducing expense of the tools.

Further, the predetermined region has the central angle of 40 degrees or more for input disk ID and the central angle of 55 degrees or more for output disk OD, as explained above. This can prevent shearing stress caused on traction surface 200 from excessively increasing, thereby serving for providing the traction drive rolling element having excellent traction transmission performance and durability. Furthermore, the predetermined region has the central angle of 70 degrees or less for input disk ID and the central angle of 85 degrees or less for output disk OD, as explained above. This can omit forming microscopic crowned-projections 30b at a portion of working surface 2 where a large increase in traction transmission is not expected, serving for reducing the production cost.

Further, traction surface 200 capable of more improving the traction transmission force can be provided by moving the tip end of grooving tool 4 by the distance of 300 μm or less along the arcuate profile of working surface 2 per one rotation of preform 1. Further, undesired fluctuation in depth of microscopic recesses 3a can be prevented by moving the tip end of grooving tool 4 by the distance of 100 μm or more along the arcuate profile of working surface 2 per one rotation of preform 1. This serves for restricting increase in the production cost.

Further, microscopic recesses 3a are formed so as to continuously change height δ of microscopic projections 3b. This prevents a loss of the relative movement between grooving tool 4 and preform 1, thereby serving for efficiently producing the traction drive rolling element having excellent durability.

Further, the recessing step using grooving tool 4 can be performed with high accuracy by driving rotating table 6 to pivotally moving grooving tool 4 as explained above. Further, microscopic recesses 3a can be formed perpendicular to or substantially perpendicular to the arcuate profile of working surface 2. This serves for providing traction surface 200 having stable traction characteristic.

Further, the pivot axis of grooving tool 4, namely, rotation axis Ot of rotating table 6, is offset from center Od of curvature of the arcuate profile of working surface 2 to approach the arcuate profile thereof, as explained above. Radius Rt of curvature of locus of the pivotal movement of grooving tool 4 is set smaller than radius Rd of curvature of the arcuate profile of working surface 2. With the arrangement, there can be provided microscopic projections 3b continuously changed in height along the arcuate profile of working surface 2.

Further, a bottom of each of microscopic recesses 3a has an obtuse curve in section by using grooving tool 4 having the tip end having radius "rt" of curvature ranging from 50 μm to 100 μm. This can reduce stress caused in the traction drive rolling element, serving for improving strength thereof. Furthermore, as compared with a grooving tool having an arcuate tip end, wear caused at the tip end of grooving tool 4 proceeds slowly. Therefore, microscopic projections 3b can be prevented from changing in height, so that stable quality of traction surface 200 can be obtained.

Further, as explained above, the pressing force of grindstone 14 is set at 500 N or less, and the pressing force of grindstones 14A and 14B is set at 500 N or less per one protrusion 14a. This can prevent grindstone 14 from being chipped, serving for continuously producing the traction drive rolling element. This can also prevent occurrence of waviness on traction surface 200 which causes reduction of accuracy in forming the profile of traction surface 200. Furthermore, microscopic crowned-projections 30b having a rounded surface at the corner portions can be formed by setting the pressing force of grindstone 14 at 50 N or more.

Further, microscopic crowned-projections 30b can be provided in a large region of working surface 2 by pivotally moving grindstone 14 along the arcuate profile of working surface 2.

Further, by using grindstone 14B having two protrusions 14a or more, the pivot angle of grindstones 14B can be adjusted smaller even though working surface 2 of preform 1 has a large area. This serves for constructing a compact crowning apparatus and efficiently performing the crowning of microscopic projections 3b on working surface 2.

Further, angle θw made between the central lines of opposed protrusions 14a, 14a around pivot axis Ow of grindstone 14B ranges from the angle smaller by 10 degrees than the pivot angle of grindstone 14B to the pivot angle as explained above. This can provide microscopic crowned-projections 30b on the entire region of working surface 2. Furthermore, this can prevent occurrence of waviness which will be caused on an imaginary surface formed by the top surfaces of microscopic crowned-projections 30b in a case where angle θw made between the central lines of opposed protrusions 14a, 14a is too large.

Further, grindstone 14 having the contact surface area relative to working surface 2 which ranges from 4 mm$^2$ to 16 mm$^2$ can be prevented from being chipped. Therefore, the crowning of the corner portions of microscopic projections 3b can be efficiently conducted. This serves for improving the productivity of the traction drive rolling element.

Further, upon the relative rotation between working surface 2 and grindstone 14, the average circumferential velocity at the contact point therebetween is in the range from 25 m/min to 350 m/min, and the speed of the pivotal movement of grindstone 14 is in the range from 5 cycles/min to 100 cycles/min, as explained above. Therefore, the crowning of the corner portions of microscopic projections 3b can be efficiently conducted. This serves for reducing the crowning time and increasing the productivity of the traction drive rolling element. Furthermore, the contact time in which working surface 2 and grindstone 14 are in contact with each other can be reduced. This can prevent occurrence of waviness which will be caused on an imaginary surface formed by the top surfaces of microscopic crowned-projections 30b.

Further, protrusions 14a of grindstones 14A and 14B have the compressive elastic modulus of not less than 1 GPa, whereby protrusions 14a can be prevented from suffering from rapid wear. This serves for enhancing the productivity of the traction drive rolling element.

Further, since grindstones 14, 14A and 14B have abrasive grains having the particle size of smaller than No.1000, microscopic crowned-projections 30b can be formed which have the rounded surface having the radius of curvature of from 2 mm to 10 mm at the corner portions and have the maximum surface roughness of 0.2 $\mu$m or less. Maximum surface roughness of microscopic crowned-projection 30b is 0.2 $\mu$m or less. This can prevent traction surface 200 from suffering from surface damage during the operation of the traction drive transmission, serving for enhancing durability of the traction drive rolling element.

Further, in a case where the rotational speed of working surface 2 is continuously changed such that the circumferential velocity of working surface 2 at the contact point between working surface 2 and grindstone 14 is constant, the surface roughness of microscopic crowned-projection 30b can be substantially uniform over the entire traction surface 200. This serves for making the quality of the traction drive rolling element more stable.

Further, as explained above, in a case where the crowning operation is conducted using grindstone 14 after microscopic projections 3b having a relatively large height are formed at the recessing step, microscopic projections 3b may be removed by the depth of not more than 5 $\mu$m from the outer-most surface. The crowning operation can be efficiently performed, whereby the crowning time can be reduced and the productivity of the traction drive rolling element can be enhanced. Furthermore, the contact time in which working surface 2 and grindstone 14 are in contact with each other can be reduced. This can prevent occurrence of waviness which will be caused on an imaginary surface formed by the top surfaces of microscopic crowned-projections 30b.

This application is based on a prior Japanese Patent Application No. 2002-302842 filed on Oct. 17, 2002. The entire contents of the Japanese Patent Application No. 2002-302842 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A method of forming a traction drive rolling element including a traction surface which has microscopic crowned-projections, the method comprising:

forming a workpiece into a preform having a central axis and a working surface having an arcuate profile in cross section taken along the central axis;

supporting the preform so as to be rotatable about the central axis;

allowing a relative movement between the preform and a grooving tool such that the grooving tool is moved along the arcuate profile of the working surface, simultaneously with rotating the preform about the central axis, to thereby form a plurality of microscopic recesses and microscopic projections alternately arranged in a direction perpendicular to the central axis along the arcuate profile;

pressing a grindstone on the working surface of the preform, the grindstone having a contact surface area of not more than 25 mm$^2$ in which the grindstone is contacted with the working surface; and allowing a relative movement between the preform and the grindstone such that the grindstone is moved along the arcuate profile of the working surface simultaneously with rotating the preform about the central axis while keeping pressing the grindstone on the working surface until a height of the microscopic projections becomes not more than 3 $\mu$m, to thereby form the traction drive rolling element including the traction surface having the microscopic crowned-projection.

2. The method as claimed in claim 1, wherein the traction drive rolling element is at least one of an input disk and an output disk cooperating with a power roller to constitute a traction drive transmission.

3. The method as claimed in claim 2, wherein the microscopic recesses and microscopic projections are formed in a predetermined region of the working surface which extends in opposite directions at an angle of ±15 degrees as taken around a center of curvature of the arcuate profile of the working surface of the preform relative to a line extending from the center of curvature of the arcuate profile to a point where the input and output disks are in contact with the power roller to set a rotational speed ratio between the input disk and the output disk at 1.2:1.

4. The method as claimed in claim 2, wherein the microscopic recesses and microscopic projections are formed in a predetermined region of the working surface of the preform for the input disk which extends at an angle ranging from 40 degrees to 70 degrees as taken around a center of curvature of the arcuate profile relative to a line extending perpendicular to the central axis and passing through the center of curvature of the arcuate profile, and the microscopic recesses and microscopic projections are formed in a predetermined region of the working surface of the preform for the output disk which extends at an angle ranging from 55 degrees to 85 degrees as taken around the center of curvature of the arcuate profile relative to a line extending perpendicular to the central axis and passing through the center of curvature of the arcuate profile.

5. The method as claimed in claim 2, wherein a distance of the relative movement between the preform and the grooving tool is in a range from 100 $\mu$m to 300 $\mu$m per one rotation of the preform.

6. The method as claimed in claim 2, wherein the relative movement between the preform and the grooving tool is made so as to adjust a height of the microscopic projections to a maximum value at a first point where the input and output disks are in contact with the power roller to set a rotational speed ratio between the input disk and the output disk at 1.2:1, and adjust the height thereof to not more than 0.5 μm at second points which are positioned at opposite sides of the first point, and wherein a first line extending through the first point and a second line extending through each of the second points make an angle of 15 degrees around the center of curvature of the arcuate profile.

7. The method as claimed in claim 6, wherein the height of the microscopic projections continuously decreases from the first point and the second point.

8. The method as claimed in claim 6, wherein the height of the microscopic projections is adjusted to not more than 3 μm.

9. The method as claimed in claim 6, wherein the height of the microscopic projections is adjusted to more than 3 μm.

10. The method as claimed in claim 6, wherein the relative movement between the preform and the grooving tool is made so as to move the grooving tool along the arcuate profile of the working surface of the preform.

11. The method as claimed in claim 10, wherein the grooving tool is pivotally moveable about a pivot axis which is offset from the center of curvature of the arcuate profile of the working surface of the preform so as to approach the arcuate profile, the grooving tool having a radius of curvature of a locus of the pivotal movement which is smaller than a radius of curvature of the arcuate profile of the working surface of the preform.

12. The method as claimed in claim 2, wherein the grooving tool has a rounded end having a radius of curvature which ranges from 50 μm to 100 μm.

13. The method as claimed in claim 1, wherein the grindstone is pressed on the working surface of the preform at a force ranging from 50 N to 500 N.

14. The method as claimed in claim 1, wherein the relative movement between the preform and the grindstone is made so as to pivotally move the grindstone along the arcuate profile of the working surface of the preform.

15. The method as claimed in claim 1, wherein the grindstone has at least one protrusion which is formed on an outer periphery of the grindstone and brought into contact with the working surface of the preform.

16. The method as claimed in claim 15, wherein the grindstone has a plurality of protrusions which are formed on an outer periphery of the grindstone and brought into contact with the working surface of the preform.

17. The method as claimed in claim 16, wherein the relative movement between the preform and the grindstone is made so as to pivotally move the grindstone along the arcuate profile of the working surface of the preform, the grindstone having a pivot axis and a pivot angle at which the grindstone is pivotally moveable, the plurality of protrusions including three protrusions arranged in circumferentially spaced relation to each other on the outer periphery of the grindstone, the three protrusions including a middle protrusion and two opposed protrusions which are disposed on both sides of the middle protrusion and have central lines extending across the pivot axis of the grindstone, respectively, the central lines of the two opposed protrusions making an angle therebetween which ranges from an angle smaller by 10 degrees than the pivot angle of the grindstone to the pivot angle of the grindstone.

18. The method as claimed in claim 1, wherein the contact surface area of the grindstone ranges from 4 mm$^2$ to 16 mm$^2$.

19. The method as claimed in claim 15, wherein the preform is rotated such that an average circumferential velocity at a contact point where the working surface of the preform and the grindstone are in contact with each other is in a range from 25 m/min to 350 m/min, and the grindstone is pivotally moved at a speed ranging from 5 cycles/min to 100 cycles/min.

20. The method as claimed in claim 15, wherein the protrusion of the grindstone has a compressive elastic modulus of not less than 1 GPa.

21. The method as claimed in claim 1, wherein the grindstone comprises abrasive grains having a particle size of smaller than No. 1000.

22. The method as claimed in claim 1, wherein the relative movement between the preform and the grindstone is made so as to, when the grindstone is pivotally moved relative to the working surface, continuously changing the rotational speed of the working surface of the preform such that a circumferential velocity of the working surface at a contact point of the working surface relative to the grindstone is constant.

23. The method as claimed in claim 1, wherein the microscopic projection of the working surface of the preform is removed by a depth of not more than 5 μm from an outer-most surface thereof.

* * * * *